US005836668A

United States Patent [19]

[11] Patent Number: 5,836,668
[45] Date of Patent: Nov. 17, 1998

Ishikawa et al.

[54] METHOD OF FORMING A REFLECTION SURFACE OF A REFLECTION MIRROR OF A VEHICLE LAMP

[75] Inventors: Masahito Ishikawa; Masahiro Maeda, both of Shizuoka, Japan

[73] Assignee: Koito Manufacturing Co., Ltd., Tokyo, Japan

[21] Appl. No.: 682,920

[22] Filed: Jul. 16, 1996

[30] Foreign Application Priority Data

Jul. 17, 1995 [JP] Japan .................................... 7-202906

[51] Int. Cl.[6] ........................................................ B60Q 1/04

[52] U.S. Cl. ............................ 362/61; 362/297; 362/346; 362/348; 359/868

[58] Field of Search ..................................... 359/868, 869; 362/61, 80, 297, 346, 348, 296, 347, 341

[56] References Cited

U.S. PATENT DOCUMENTS

| | | | |
|---|---|---|---|
| 1,903,417 | 4/1933 | Grant | 362/297 |
| 4,417,300 | 11/1983 | Bodmer | 362/304 |
| 4,481,563 | 11/1984 | Snyder et al. | 362/80 |
| 5,034,867 | 7/1991 | Mayer | 362/297 |
| 5,065,287 | 11/1991 | Staiger et al. | 362/61 |
| 5,067,053 | 11/1991 | Akizuki | 362/61 |
| 5,096,281 | 3/1992 | Windebank et al. | 359/868 |
| 5,192,124 | 3/1993 | Kawashima et al. | 362/61 |
| 5,204,820 | 4/1993 | Strobel et al. | 362/297 |
| 5,408,363 | 4/1995 | Kano | 359/869 |
| 5,532,909 | 7/1996 | Ban et al. | 362/61 |

FOREIGN PATENT DOCUMENTS

| | | |
|---|---|---|
| 5076546 | 11/1948 | Japan . |
| 334891 | 9/1930 | United Kingdom . |
| 2 262 980 | 7/1993 | United Kingdom . |

*Primary Examiner*—Alan Cariaso
*Attorney, Agent, or Firm*—Sughrue, Mion, Zinn, Macpeak & Seas, PLLC

[57] ABSTRACT

A method of forming a reflection surface of a reflection mirror of a vehicle lamp includes the following steps. A basic reflection surface is formed by preliminarily setting a basic reflection surface on which multiple paraboloids are to be formed, under a setting condition. Angles θ at which light that is emitted from a light source located at a focal point is incident on different positions on the basic reflection surface, are calculated, to thereby form a plural number of contours of equal incident angles on the basic reflection surface. A distribution of incident angles is evaluated on the basis of the contours of equal incident angles. If the result of the evaluation is good, the basic reflection surface is set as a final basic reflection surface. If it is no good, the setting condition is changed to another or other setting conditions, and the step of the preliminary setting and the step of the evaluation of the incident angle distribution are repeated under the changed setting condition or conditions. Through those steps, a basic reflection surface can reliably be set which has an incident angle distribution excellent in suppressing the generation of dark portions on the reflection surface to the minimum and at the same time securing a required solid angle of the reflection mirror.

18 Claims, 6 Drawing Sheets

METHOD OF FORMING A REFLECTION SURFACE OF A REFLECTION MIRROR OF A VEHICLE LAMP

BACKGROUND OF THE INVENTION

The present invention relates to a vehicle lamp such as a tail lamp, stop lamp, and turn signal lamp, and more particularly, to a method of forming the reflection surface of a reflection mirror of a vehicle lamp.

Generally, the reflection mirror of a vehicle lamp includes a reflection surface formed from a paraboloid of revolution for providing parallel light beams. In case where a space to receive the lamp is limited by a body structure of the vehicle, the reflection surface is formed from multiple paraboloids to reduce the thickness of the reflection mirror, as disclosed in Japanese Utility Model Unexamined Publication No. Sho. 50-76546.

In current vehicles, the design, for example, the body configuration, also is a factor limiting the space for accommodating the lamp, in addition to the body structure. Accordingly, a reflection surface, which is simply formed using concentrically arrayed paraboloids of revolution, is insufficient for meeting the requirements for lighting devices for current vehicles.

Another solution to the problem is proposed in GB 2262980. In that solution, a so-called free curved surface reflection mirror is set, and the concept of multiple paraboloids is applied to the reflection surface, to thereby increase a freedom of configuration.

The multiple paraboloids of the free curved surface reflection mirror are formed in the following manner.

As shown in FIG. 1, a basic reflection surface Ro is first set as a curved surface based on the restrictive conditions applicable to the vehicle body. Then, a plurality of paraboloids of revolution P1, P2, P3, . . . with different focal distances, which have a common axis (axis A) and a focal position as a fixed point F located in the vicinity of the basic reflection surface Ro, are set. A plurality of closed curves C1, C2, C3, . . . as the intersecting lines of the basic reflection surface Ro and the paraboloids of revolution P1, P2, P3, . . . are formed. A reflection step defined by a portion of the paraboloid of revolution Pi that formed the closed curves Ci is formed between the adjacent ones of those closed curves C1, C2, C3, . . . , respectively, as shown in FIGS. 2(*a*) and 2(*b*). As a result, a reflection surface R is formed in the form of the multiple paraboloids along the basic reflection surface Ro.

However, when the concept of the multiple paraboloids is applied to the free curved surface reflection mirror, the following problems arise, The basic reflection surface is set on the basis of certain restrictive conditions, such as the body structure and the external form of the body, as mentioned above. The lighting function inherent to the lighting device requires a large solid angle of the reflection mirror. Therefore, it is preferable to set the basic reflection surface so that a light source is positioned at a place located as far as possible from the front of the lighting device.

If the basic reflection surface is set so as to form the curved surface based on the body restrictive conditions, while securing a satisfactory solid angle, the light source is positioned at a place located far from the front of the device. If the light source is so placed, it is difficult to distribute a sufficiently large luminous flux to every location on the basic reflection surface. In fact, some locations receive a small luminous flux, and some other locations receive no luminous flux since those are subject to a blockage of light from the light source.

Where the luminous flux is insufficient on some locations on the basic reflection surface, even if the multiple paraboloids are formed on such a basic reflection surface, the lumninance of the parallel light beams reflected from those locations receiving an insufficient luminous flux is very small or zero. When the lamp provided with such a reflection surface is seen from the front thereof along the optical axis, dark portions are observed, and hence a visual perception of the lamp is poor.

SUMMARY OF THE INVENTION

The present invention has been made in view of the above circumstances and has an object to provide a method of forming a reflection surface of a reflection mirror of a vehicle lamp, which provides a reflection minor having a good visual perception and satisfying the body restrictive conditions by applying the multiple paraboloids to a reflection mirror with a free curved surface.

To achieve the above object, not only the restrictive body conditions, but also a distribution of angles at which light is incident on the basic reflection surface, are taken into consideration in setting the basic reflection surface. This technical idea of the invention succeeds in suppressing the generation of dark portions on the reflection surface, while at the same time securing a required solid angle of the reflection mirror.

The present invention concerns a method of forming the reflection surface of a reflection mirror of a vehicle lamp which sets a basic reflection surface as a curved sur face based on the body restrictive conditions, sets a plural number of paraboloids of revolution with different focal distances, but disposed on a common axis. There is a focal position as a fixed point located in the vicinity of the basic reflection surface, and a plurality of reflective steps, each step comprising a portion of the respective paraboloids of revolution between the adjacent ones of those curves formed as the intersecting lines of the basic reflection surface and the paraboloids of revolution.

According to a first aspect of the invention, the method of forming the reflection surface of a reflection mirror of a vehicle lamp is characterized by a process including the steps of: 1) preliminarily repeating the step of setting the basic reflection surface under different setting conditions; 2) calculating angles at which light that is emitted from a light source located at a focal position, is incident on different positions on each of the candidate basic reflection surfaces preliminarily set, and evaluating a distribution of the incident angles on each of the basic reflection surfaces; and 3) specifying the one of the candidate basic reflection surfaces having the best incident angle distribution and setting it as the final basic reflection surface.

Further, according to a second aspect of the invention, the method of forming the reflection surface of a reflection mirror of a vehicle lamp is characterized by another process including the steps of: 1) preliminarily executing the step of setting the basic reflection surface under first setting conditions; 2) calculating angles at which light that is emitted from a light source located at a focal position, is incident onto different positions on the basic reflection surface preliminarily set, and evaluating a distribution of the incident angles on the basic reflection surface; and 3) if the result of the evaluation reaches a preset evaluation level, setting the candidate basic reflection surface as the final basic reflection surface, and if the evaluation result fails to reach the preset evaluation level, changing the setting condition to other setting conditions, and repeating the step of preliminarily setting the basic reflection surface under the changed setting conditions and the step of evaluating the incident angle distribution on the basic reflection surface preliminarily set until the evaluation result reaches a preset evaluation level.

Any evaluation method is available for an evaluation of the incident angle distribution, if the method is based on the results of calculating the angles at which light is incident on different positions on the basic reflection surface. The incident angle distribution may be evaluated by simply using the calculated values per se or on the basis of a plural number of contours of equal incident angles depicted on the basic reflection surface. The distances from the light source to the light incident positions on the basic reflection surface may be taken into consideration, in addition to the results of calculating the incident angles. If another lamp is located near it, the visual perception of its adjacent lamp and a balance of then may be additionally considered for the evaluation of the incident angle distribution.

The evaluation of the incident angle distribution may be made automatically by processing the calculated values of the incident angles or the contours of equal incident angles by a computer, or sensuously by a human being (designer), viz., based on visual observations and experience.

In the second aspect of the invention, the result of the evaluation reaches a preset evaluation level when there is a state in which the incident angle distribution is evaluated to be in the lowest evaluation level that can satisfy the requirement of suppressing the generation of dark portions on the reflection surface to the minimum, and at the same time securing a required solid angle of the reflection mirror.

As described above, the method of the first aspect of the invention comprises the first step of setting at least two candidate basic reflection surfaces under different setting conditions, the second step of calculating angles at which light that is emitted from a light source located at the focal position is incident on different positions on each of the candidate basic reflection surfaces preliminarily set, and evaluating a distribution of the incident angles on each of the candidate basic reflection surfaces, and the third step of specifying the candidate basic reflection surface having the best incident angle distribution and setting it as the final basic reflection surface. Therefore, the first aspect of the invention can form the basic reflection surface having a better incident angle distribution when compared with the method in which the step of setting the basic reflection surface is executed once under a setting condition, in satisfying the requirement of suppressing the generation of dark portions on the reflection surface to the minimum, and at the same time securing a required solid angle of the reflection mirror.

The method of the second aspect of the invention comprises the first step of preliminarily executing the step of setting the basic reflection surface under a setting condition, the second step of calculating angles at which light that is emitted from a light source located at the focal position is incident on different positions on a candidate basic reflection surface that is preliminarily set, and evaluating a distribution of the incident angles on the candidate basic reflection surface, and the third step in which if the result of the evaluation reaches a preset evaluation level, the candidate basic reflection surface is set as the final basic reflection surface, and if the evaluation result fails to reach the preset evaluation level, the setting condition is changed to other setting conditions, and the step of preliminarily setting the basic reflection surface under the changed setting conditions and the step of evaluating the incident angle distribution on a candidate basic reflection surface preliminarily set are repeated until the evaluation result reaches the preset evaluation level. Therefore, the second aspect of the invention can reliably form the basic reflection surface having an incident angle distribution excellent in satisfying the requirement of suppressing the generation of dark portions on the reflection surface to the minimum, and at the same time securing a required solid angle of the reflection mirror.

Accordingly, the present invention is capable of producing a reflection mirror having a good visual perception and satisfying body restrictive conditions by applying the multiple paraboloids to a reflection mirror with a free curved surface.

In the invention, if the result of the evaluation reaches a preset evaluation level, the basic reflection surface formed by the first setting step is set as the final basic reflection surface. Therefore, the unnecessary operations of setting the basic reflection surface are eliminated. In connection with this, the first preparatory setting step of the basic reflection surface may be executed under rough body restrictive conditions, and if the evaluation result fails to reach the preset evaluation level, the next and subsequent preparatory setting steps are executed under more precise body restrictive conditions. Therefore, the possibility to form a desired basic reflection surface without the unnecessary operations of setting the basic reflection surface is further increased.

The following method may be employed for an evaluation of the incident angle distribution.

In an evaluation method where the calculated values of the incident angles are simply used for an evaluation process, it is judged that the incident angle distribution is good"(G) when the maximum value of the angles of the light beams incident on the calculated basic reflection surface is small (the direction of light incident on the basic reflection surface is closer to the direction vertical to the surface). In other words, the smaller the maximum value, the better the incident angle distribution.

In an evaluation method that is based on a plural number of contours of equal incident angles depicted on the basic reflection surface, it is judged that the incident angle distribution is good" when there are only the contours of equal incident angles that are smaller than an a critical incident angle", which is allowable in securing the visual perception of the lamp within the reflection surface area, or when the contours of equal incident angles are not intricate in shape. In this case, each area between the adjacent contours of equal incident angles may be visually presented as having different colors. This makes it easy to evaluate the incident angle distribution by the eye.

Additional facts may be taken into consideration in the evaluation of the incident angle distribution, in addition to the calculation results of the light incident angles. For example, as the luminance of the reflecting light becomes smaller, the larger will be the distance between the light source and the light incident position on the reflection minor. Therefore, the definition of the critical incident angle" may be more strict, as the distance increases. Further, if another lamp is located adjacent the present lamp, the visual perception of the present lamp at a location on the reflection surface may be made to resemble that of the adjacent lamp.

Similar calculations may be made using the solid angle, rather than the incident angle, as would be understood by one of ordinary skill in the art.

DETAILED DESCRIPTION OF THE INVENTION

Preferred embodiments of a method of forming the reflection surface of a reflection mirror of a vehicle lamp will be described with reference to the accompanying drawings.

Figure 3:
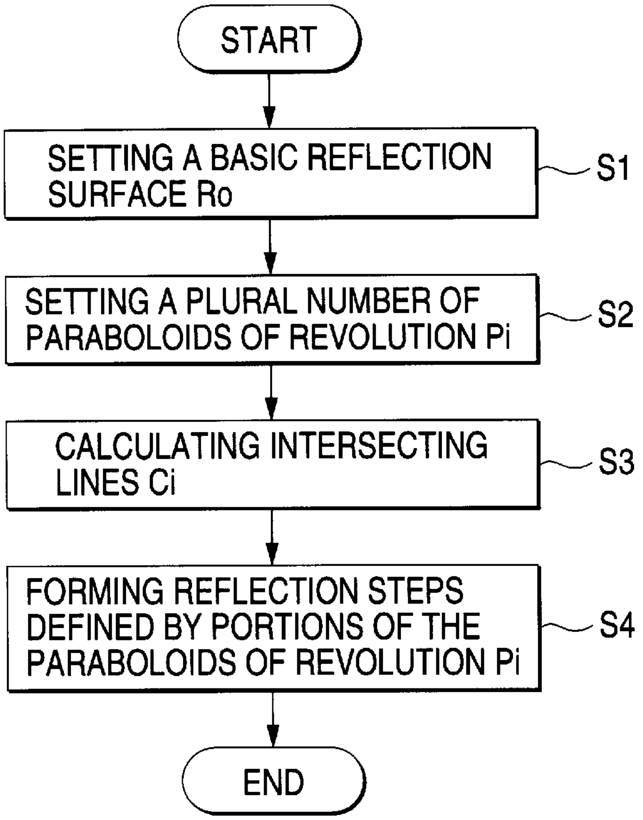
FIG. 3 is a flow chart showing the basic steps in a method of forming the reflection surface of a reflection mirror of a vehicle lamp according to the present invention.

FIG. 3 is a flow chart showing the basic steps in a method of forming the reflection surface of a reflection mirror for a vehicle lamp according to the present invention, and FIG. 4 is a flow chart showing in greater detail certain major steps of the reflection surface forming method of the embodiment.

Figure 1:
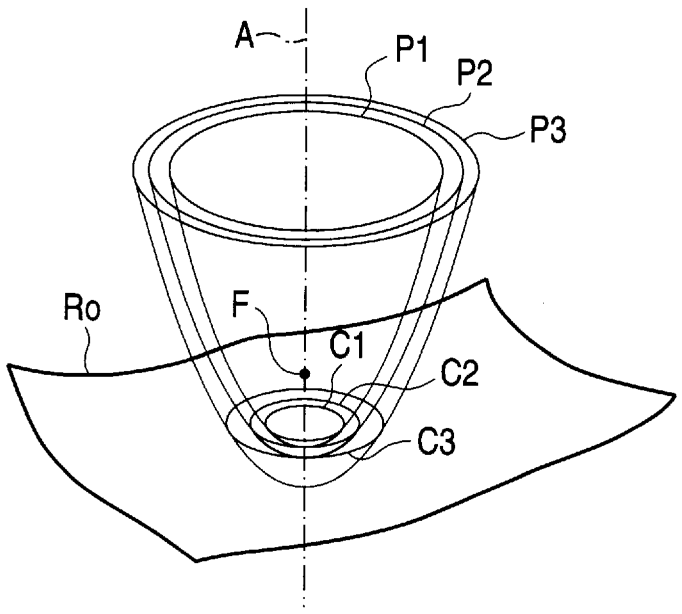
FIG. 1 is a perspective view showing a method of forming multiple paraboloids on a free curved surface reflection mirror which presents the base of the present invention.
Figure 2A:
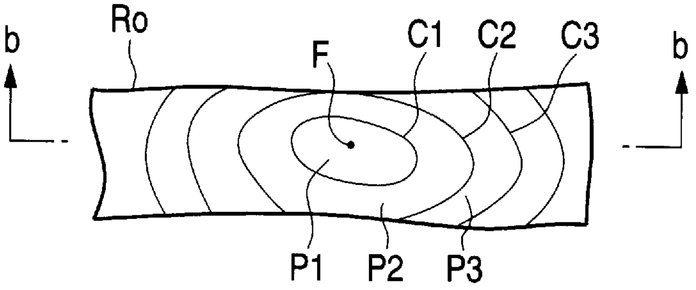
FIGS. 2(*a*) and 2(*b*) are a front view and a sectional view for explaining the method of forming surface contours based on multiple paraboloids.
Figure 2B:
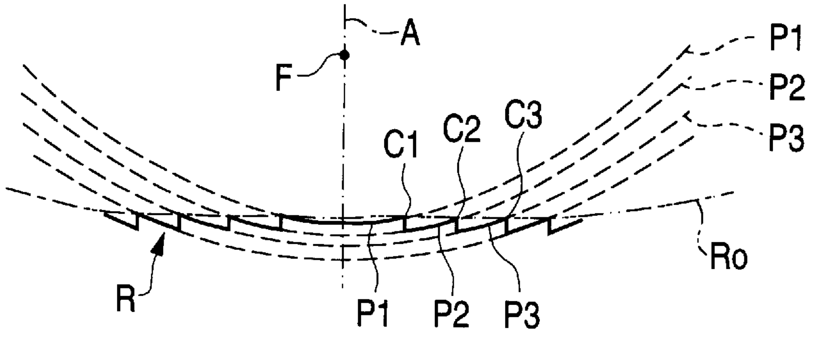

The outline of the reflection surface forming method according to the embodiment of the present invention will be described by using a flow chart shown in FIG. 3. The reflection surface forming method corresponds to the method of forming the reflection surface R in the form of the multiple paraboloids along the basic reflection surface Ro, which was already described in the "BACKGROUND OF THE INVENTION" section while referring to FIGS. 1 and 2. A procedure for the reflection surface forming method will be described hereinafter.

To start, a basic reflection surface Ro is set as a curved surface based on the body restrictive conditions (Step S1). Then, a plurality of paraboloids of revolution P1, P2, P3, . . . with different focal distances, which have a common axis (axis A) and a focal position as a fixed point F located in the vicinity of the basic reflection surface Ro, are set (Step S2). 3) A plurality of closed curves C1, C2, C3, . . . as the intersecting lines of the basic reflection surface Ro and the paraboloids of revolution P1, P2, P3, . . . are formed (Step S3). 4) Reflection steps, each defined by the respective paraboloids of revolution Pi that formed the closed curves Ci, are formed between adjacent pairs of those closed curves C1, C2, C3, . . . (Step S4).

The basic reflection surface Ro is set on the basis of the body restrictive conditions, as mentioned above. In setting the basic reflection surface Ro, to secure the largest possible solid angle of the reflection mirror, which is essential to the lighting function of the lamp, and to secure the best visual perception of the lighting device, it is desirable to distribute a sufficiently large luminous flux to every locations on the basic reflection surface. Accomplishment of this goal will minimize the generation of dark portions on the reflection surface.

In the present embodiment, the body restrictive conditions, and additionally a solid angle of the basic reflection surface Ro and a distribution of angles (referred to as incident angles) at which light is incident on the basic reflection surface Ro, are taken into consideration in setting the basic reflection surface Ro.

A processing system for executing a procedure of setting the basic reflection surface Ro in view of these criteria, and the procedure itself will be described with reference to the system in FIG. 4A and the flow chair shown in FIG. 4B.

Figure 4A:
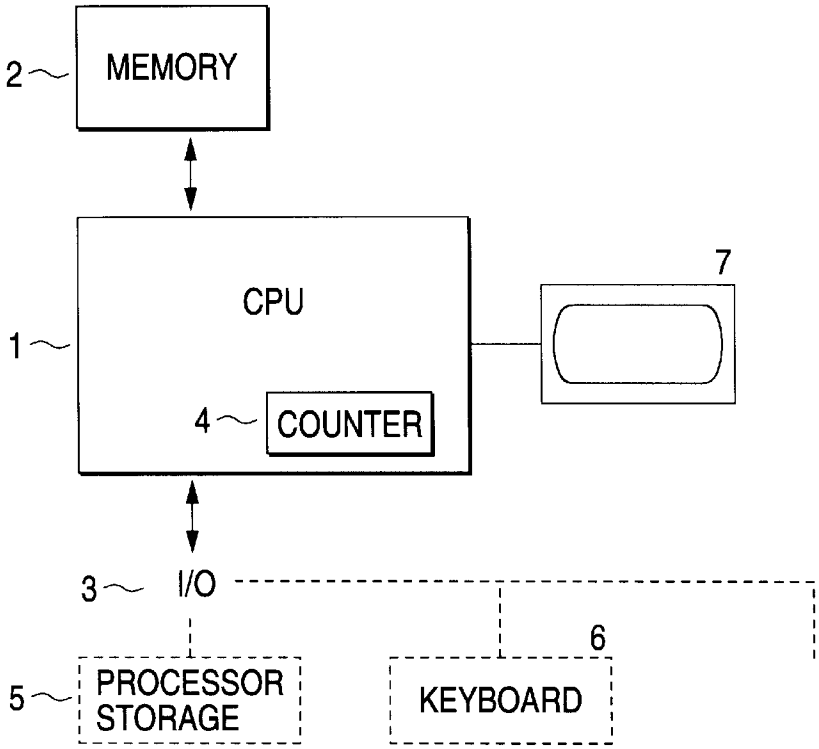
FIGS. 4A and 4B are views of a system and a flow chart showing the reflection surface forming method of an embodiment of the invention.

FIG. 4A shows a block illustration of a basic processing system comprising a CPU 1 which has access to a memory 2 for storing data or programs as well as conventional sources of data and programs, such as a keyboard 6 or floppy disk 5, via an I/O port 3. The CPU may have a counter 4 for purposes to be explained and may be connected to a display 7 for providing an operator with information that enables interactive operations.

Figure 4B:
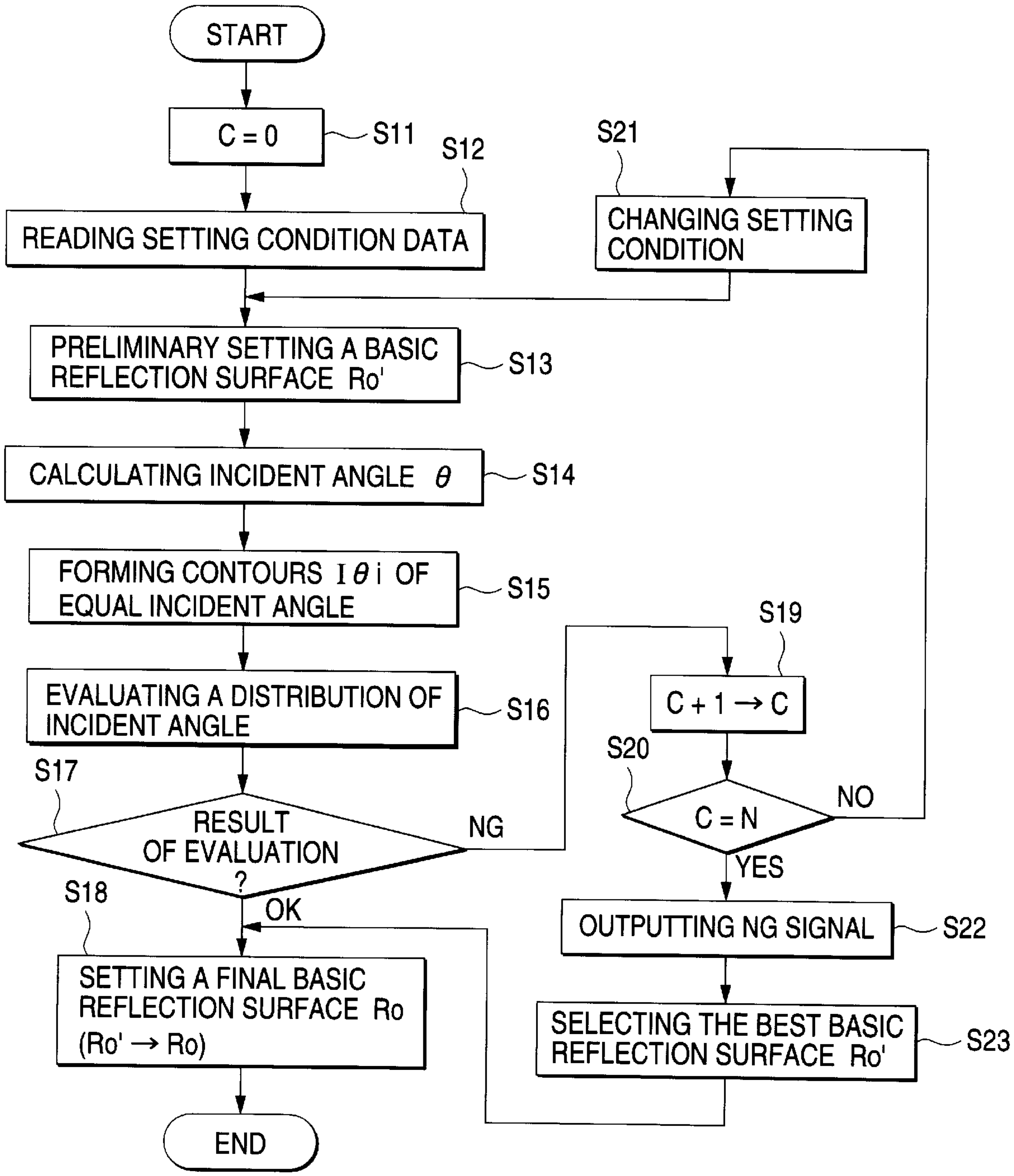

With reference to the program in FIG. 4B, after resetting the counter 4 (C=0), various setting condition data required for setting the basic reflection surface Ro are read into the related memory (Steps S11 and S12). The setting condition data to be read include data defining the configuration of the reflection surface of the reflection mirror, the position of a light source (the light source is positioned at a place located far from the front of the lamp in order to obtain a large solid angle of the reflection mirror), and the body restrictive conditions (body structure and the external form of the body).

A basic reflection surface Ro' is preliminarily set on the basis of the various setting condition data (Step S13).

Figure 5:
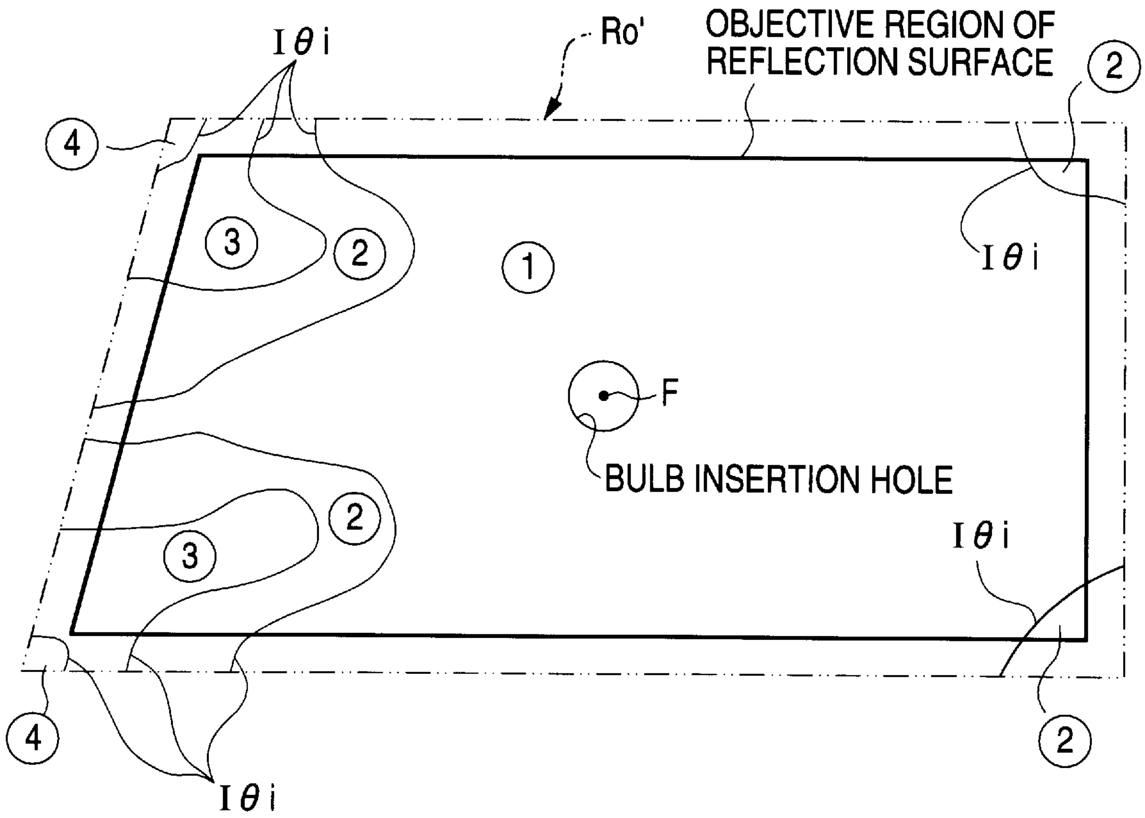
FIG. 5 is a front view showing a specific example of contours of equal incident angles formed by the embodiment.

Incident angles θ of light beams that are emitted from a light source positioned at the focal position F and incident on every locations on the preliminarily set basic reflection surface Ro' (see FIG. 6) are calculated (Step S14). A plural number of contours Iθi (where i=1–n and n is a whole number) of equal incident angles are depicted on the basic reflection surface Ro' using the data of the calculated incident angles θ, as shown in FIG. 5 (Step S15). The contours Iθi of equal incident angles are depicted on a trapezoidal frame indicated by two-dot chain line in FIG. 5 that is larger than an area (trapezoidal frame indicated by a solid line) actually used as the basic reflection surface Ro'. The larger area is used for providing an easy evaluation of the incident angle distribution on the basic reflection surface Ro', that is made on the basis of the contours Iθi of equal incident angles (the evaluation will be described later).

Figure 6:
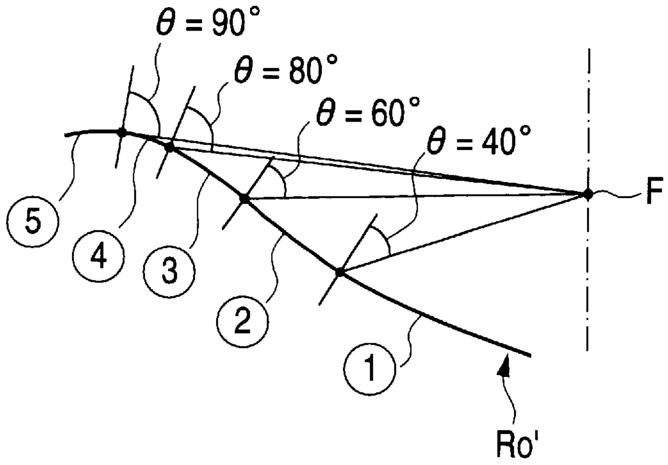
FIG. 6 is a diagram for explaining the rules how to set up reflection surface regions in forming the contours of equal incident angles.

As shown in FIG. 6, the equal-incident-angle contours Iθi of four different angles, θ=40°, 60°, 80°, 90°, are depicted. In the figure, ① indicates a reflecting area where 0°23 θ23 40°; ②, a reflecting area where 40°<θ≦60°; ③, a reflecting area where 60°<θ≦80°; ④, a reflecting area where 80°<θ≦90°; and ⑤, reflecting area (no light is incident on this area) where 90°<θ. The reflecting areas ①, ②, ③, and ④ appear on the basic reflection surface Ro' of FIG. 5. The reflecting area ④ is out of the actual reflecting area on the basic reflection surface Ro'. Therefore, it is seen that of light beams emitted from the light source, the light beams of the incident angles of more than 80° are not incident on the actual reflecting area on the basic reflection surface Ro'.

Returning to the flow chart of FIG. 4, a distribution of the incident angles on the basic reflection surface Ro' is then evaluated (Step S16). The incident angle distribution is made in order to secure a required solid angle of the reflection mirror and at the same time to minimize the generation of dark portions on the reflection surface. In a case where only sub-critical" equal-incident-angle contours, i.e., the angles below a critical incident angle (e.g., 80°) that are effective in securing the visual perception of the lamp, are present in the actual reflecting area of the basic reflection surface Ro', the result of the evaluation is good"(G). In other cases, the result of the evaluation is no good" (NG). In the case of FIG. 5, only the reflecting areas ①, ②, and ③ are present in the reflecting area. Accordingly, the evaluation result is good".

If the evaluation result is good, the basic reflection surface Ro' can be used as the final basic reflection surface Ro since no problems arises if it is used as it is (Steps S17 and S18).

If the evaluation result is nogood", it is not desirable to use the basic reflection surface Ro' as it is. The system retries the step of setting the basic reflection surface Ro and, if necessary, will repeat the step several times. To be more specific, the system increments the counter (C+1→C), and then judges whether or not C=N (an evaluation result NG can be obtained only a preset number of times N) (Steps S19 and S20).

If C<N, the system judges that there is still room for further improvement of the basic reflection surface Ro', and some of the setting condition data of the basic reflection surface Ro are changed (Steps S20 and S21). More precise body form data, for example, is used. The system again carries out the process beginning with the step of preliminarily setting the basic reflection surface Ro' and proceeding to the step of evaluating the incident angles on the basis of the changed setting condition data (Steps S13 to S16). This process is repeated until the evaluation result becomes good". If C=N, the system judges that there is no time to repeat a further retrying operation or that no further improvement of the basic reflection surface Ro is possible. In such case, it outputs an NG signal and selects the basic reflection surface Ro' for which the incident angle distribution evaluation is the highest among the N number of evaluations thus far made, and sets it as the final basic reflection surface Ro (Steps S20, S22, S23, S18). The system issues the NG signal in order to inform a designer of the fact that the final basic reflection surface Ro obtained is not the basic reflection surface first expected. In response to the NG signal, the designer may perform the retrying operation after changing the setting conditions not yet changed (e.g., light source position) of the setting condition data of the basic reflection surface Ro.

The foregoing description of the method of the present invention is based on the incident angle of light from the source at point F (FIG. 6). However, it is within the scope of the present invention to use the solid angle of the reflection mirror, as would be understood by one of ordinary skill in the art.

The process described in flow chart form in FIGS. 3 and 4 may be converted into storable and computer processable form, as would be understood by one of ordinary skill in the art, and that form may be stored on a readable medium, such as a floppy disk, ROM, RAM or the like.

Figure 7:
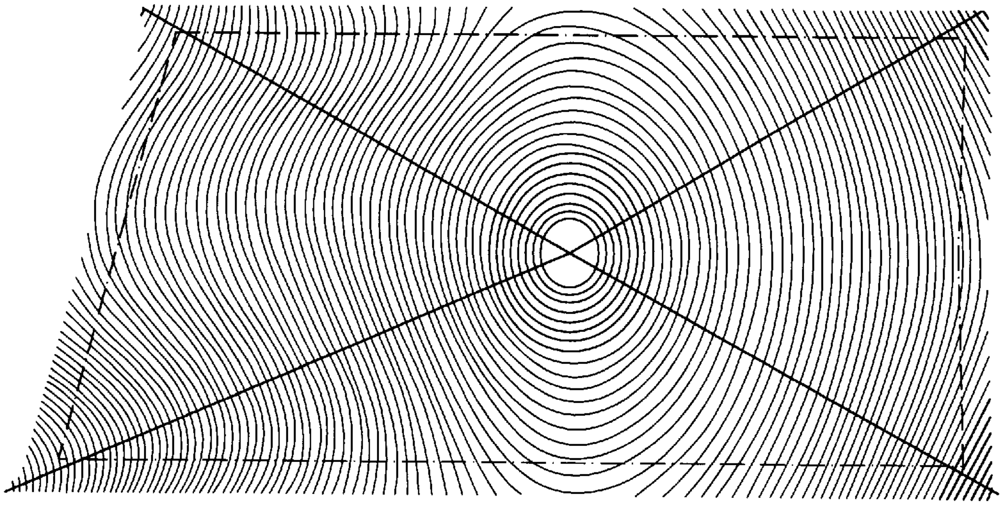
FIG. 7 is a diagram showing a reflection surface with multiple paraboloids formed on and along the basic reflection surface of FIG. 5.

FIG. 7 is a diagram showing a reflection surface with multiple paraboloids formed on and along the basic reflection surface Ro of FIG. 5. The light beams reflected from the reflection surface R thus formed are substantially parallel and uniform in luminous flux. In an actual lamp, a lens with fisheye steps is located on the front side of the reflection mirror. When viewed from the front of such a lamp with the fisheye lens, the luminous flux is uniformly distributed over the front face of the lamp.

A specific example of a step of changing the setting conditions and the preliminary setting of the basic reflection surface Ro' when the evaluation result is NG will be described.

Figure 8:
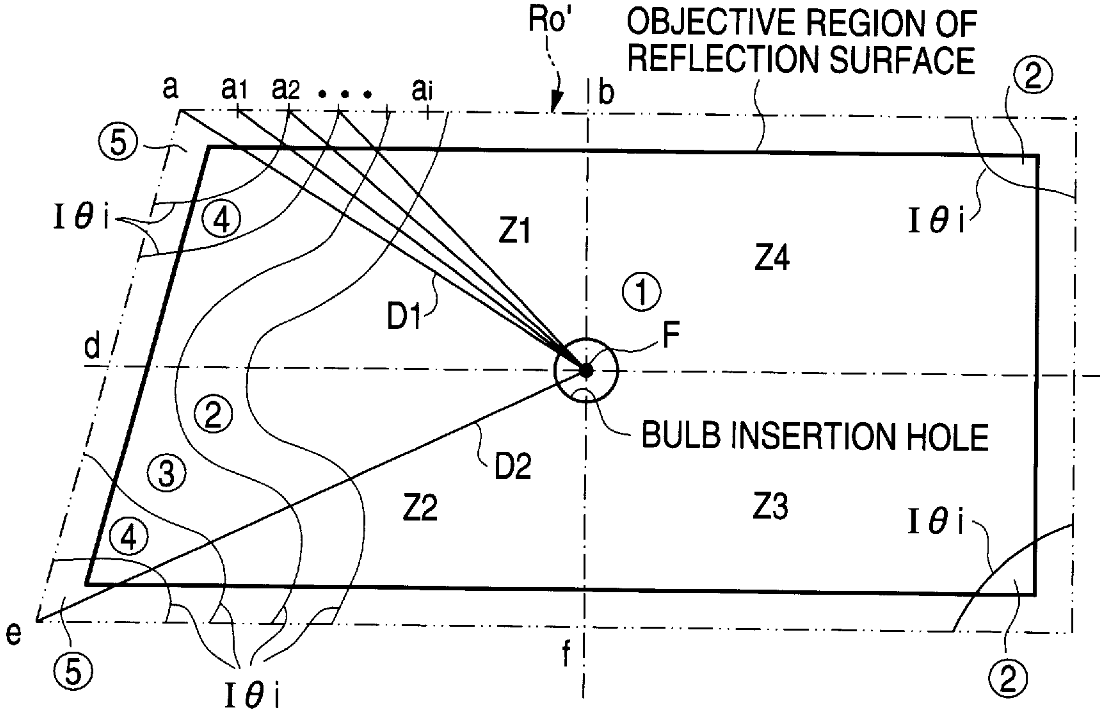
FIG. 8 is a front view useful in explaining a specific example where the result of the evaluation of the incident angle distribution is NG (no good), and as the result of the NG evaluation, the setting condition is changed and a basic reflection surface is set again on the basis of the changed setting condition.

The process will be described by using a case where such an incident angle distribution is such that the reflecting area of the basic reflection surface Ro' contains a reflecting area ④ where the incident angle θ is above the critical incident angle 80°, and a reflecting area ⑤ where the incident angle exceeds 90°, viz., there is no incident light, as shown in FIG. 8.

In such a case, the basic reflection surface Ro' is divided into four zones Z1, Z2, Z3 and Z4 as shown, and the zones Z1 and Z2 containing the reflecting areas ④ and ⑤ are corrected in the following manner.

Figure 9:
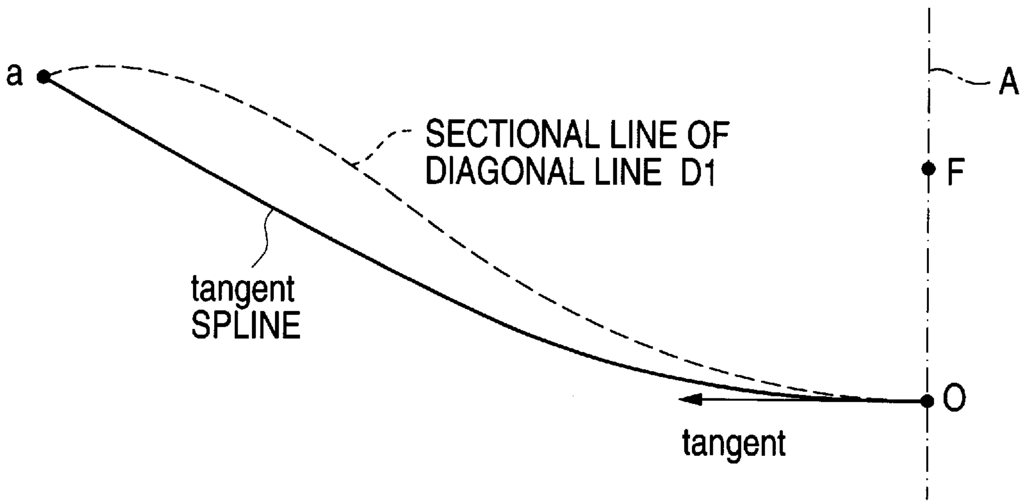
FIG. 9 is a diagram for explaining a process to form a surface in the example of FIG. 8.

In the zone Z1, the surface along a diagonal line D1 is placed under the most severe incident angle condition. Because of this, let us consider a line of the cross section taken on the diagonal line D1. The line of the cross section is depicted as indicated by a broken line in FIG. 9. Then, a curve that is prolonged in the tangential direction from an intersecting point O of the basic reflection surface Ro' and the axis A and reaches a point a at a corner of the outer circumference of the zone Z1, as indicated by a solid line in FIG. 9, is formed by using a tangent spline, for example. As shown, the curve formed is curved outwardly and toward the rear of the reflection mirror. Accordingly, an incident angle θ at which a light beam is incident on the surface along the line of the cross section taken on the diagonal line D1 is much smaller than the critical incident angle 80°.

As shown in FIG. 8, two to eight points a1, a2, . . . are put between the point a on the outer circumference of the zone Z1 and a point b at the boundary between the outer circumferences of the zones Z1 and Z4. Curves extending between these points ai and the intersecting point O are formed by using the tangent spline as in the previous manner. Then, one curved surface is formed by using these formed curves.

Figure 10:
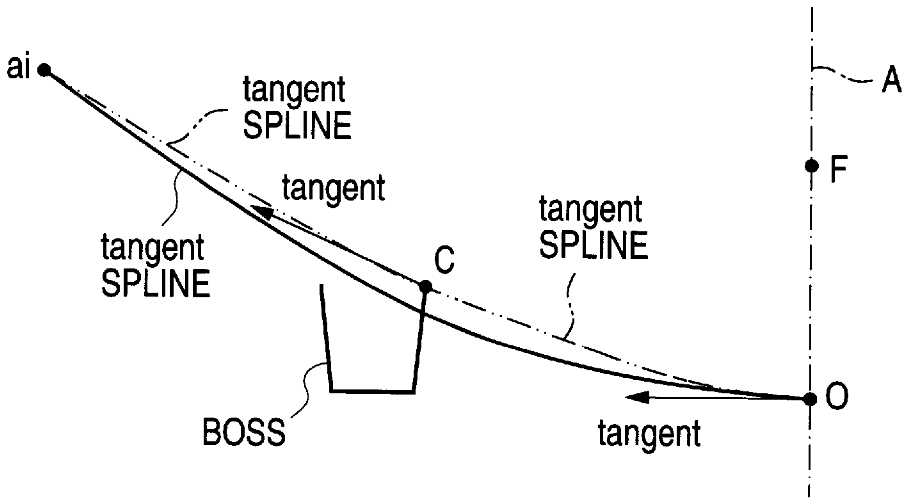
FIG. 10 is a diagram for explaining another process to form a surface in the example of FIG. 8.

If during the curve generation process, it is found that the restriction of the body structure prevents the use of the generated curve, the curve is further corrected. As shown in FIG. 10, if the curves extended from the points ai interfere with a boss for mounting the reflection mirror, a point c at a corner of a protruded part of the boss is put between the intersecting point O and the points ai. Then, curves between the intersecting point O and the point c, and curves between the point c and the points ai are generated (those lines are indicated by two-dot chain lines in the figure).

A plural number of points are put also between the point a on the outer circumference of the zone Z1 and a point d at the boundary between the zones Z1 and Z2. Curves connecting, those points are generated by using the tangent spline as in the previous manner. Then, one curved surface is formed by using these generated curves.

Also for the zone Z2, a line of the cross section taken on its diagonal line D2 is changed to a curve connecting the intersecting point O and a point e at a corner of the outer circumference of the zone Z2. A plural number of points are put between the point e and a point f at the boundary between the outer circumferences of the zones Z2 and Z3, and between the point e and a point d at the boundary between the outer circumferences of the zones Z2 and Z1. Curves are generated between those points and the intersecting point O by using the tangent spline as in the previous manner. These curves are combined into a single curved surface.

Through the step as mentioned above, the preliminary setting of the basic reflection surface Ro', which is different from the first one, has been performed.

As described above, the method of the present embodiment comprises three steps. There is a first step of preliminarily setting the basic reflection surface Ro under a setting condition. Then, there is a second step of calculating angles θ at which light that is emitted from a light source located at the focal position, is incident on different positions on the basic reflection surface Ro' preliminarily set, and evaluating a distribution of the incident angles on the basic reflection surface Ro'. Finally, there is a third step in which if the result of the evaluation reaches a preset evaluation level, the basic reflection surface Ro' is set as the final basic reflection surface Ro, and if the evaluation result fails to reach the preset evaluation level, the setting condition is changed to other setting conditions, and the step of preliminarily setting the basic reflection surface Ro' under the changed setting conditions and the step of evaluating the incident angle distribution on the basic reflection surface Ro' preliminarily set are repeated until the evaluation result reaches the preset evaluation level. Therefore, the embodiment of the present invention can reliably form the basic reflection surface having an incident angle distribution excellent in satisfying the requisite of "to suppress the generation of dark portions on the reflection surface to the minimum, and at the same time to secure a required solid angle of the reflection mirror".

Accordingly, the present invention is capable of producing a reflection mirror having a good visual perception and satisfying body restrictive conditions by applying the multiple paraboloids to a reflection mirror with a free curved surface.

In the embodiment of the invention, if the result of the evaluation reaches a preset evaluation level, the basic reflection surface Ro' formed by the first setting process is set as the final basic reflection surface Ro. Therefore, there is eliminated the useless operations of setting the basic reflection surface Ro. Further, in the present embodiment, the first preliminarily setting process of the basic reflection surface Ro is executed under rough body restrictive conditions, and if the evaluation result fails to reach the preset evaluation level, the next and subsequent preliminarily setting processes are executed under more precise body restrictive conditions. Therefore, the possibility to form a desired basic reflection surface Ro without the useless operations of setting the basic reflection surface is further increased.

In the embodiment, when the retrying operation is repeated N times, the basic reflection surface Ro' for which the incident angle distribution evaluation is the highest among the N number of evaluations is selected and set as the final basic reflection surface Ro. Thus, the repeating of the retrying operation is not endless. Even if the evaluation result is not in excess of the preset evaluation level, it is possible to set the basic reflection surface Ro with the incident angle distribution, which is the best among all those obtained.

The vehicle lamp to which the reflection surface forming method of the invention is most effectively applied is a tail lamp which requires the highest degree of visual perception of the lighting device. As a matter of course, the method of the invention is applicable to any of other lamps requiring a high visual perception.

The automatic setting of the basic reflection surface Ro has been handled in the above-mentioned embodiment. However, the setting of the basic reflection surface Ro may be made manually or by a designer, as a matter of course. This will be described in connection with the flow chair of FIG. 4. The designer intensely commits to the process of the steps S16, S20 and S21. Specifically, the evaluation of the incident angle distribution in the step S16 is made sensuously by a designer, viz., with the aid of his visual sensation and experiences. The setting of the number of retrying operations in the step S20 may be made on the basis of a designer's judgement for the room for improvement of the incident angle distribution that is based on his intuition and experiences. The setting condition change in the step S21 may also be made on the basis of his intuition and experiences. In this case, the areas each between the adjacent contours of those contours of equal incident angles may be visually presented with different colors. This makes it easy to evaluate the incident angle distribution by the eye. In this regard, the evaluation of the shape of the basic surface may be conducted either by optical devices or by an operator who interactively controls the inputs to the processing described above. Specifically, with respect to the shape of the basic surface as shown in FIG. 8, the slant of the formed surface may be observed by the human eye observing the reflection of light from a light source and the result of such observation used as a basis for keyboard input to the system which executes the foregoing method.

In the embodiment mentioned above, only when the evaluation result fails to reach a preset evaluation level, the retrying operation is repeated a limited number of times. In an alternative, irrespective of the evaluation result, the preliminary setting of the basic reflection surface Ro' is repeated a plural number of times under different setting conditions, and the incident angle distributions of the generated basic reflection surfaces are evaluated. The basic reflection surface Ro' having the best incident angle distribution is selected and set as the final basic reflection surface Ro.

What is claimed is:

1. A method of forming a reflection surface of a reflection mirror of a vehicle lamp comprising the steps of setting a basic reflection surface as a curved surface based on body restrictive conditions, setting a plural number of paraboloids of revolution with different focal distances, said paraboloids having a common axis and a focal position as a fixed point located in the vicinity of the basic reflection surface, and forming reflection steps defined by portions of the respective paraboloids of revolution between adjacent ones of curves formed as intersecting lines of the basic reflections surface and the paraboloids of revolution, wherein the step of setting a basic reflection surface comprises the steps of:

setting at least two candidates basic reflection surfaces, said surfaces being defined by setting conditions, under respective setting conditions which differ among said at least two candidates basic reflection surfaces, calculating incident angles at which light emitted from a light source located at the focal position is incident on different positions on each of said at least two candidate basic reflection surfaces;

evaluating a distribution of said incident angles on each of said at least two candidate basic reflection surfaces; and setting the candidate basic reflection surface having a desired incident angle distribution as a final basic reflection surface.

2. A method of forming a reflection surface of a reflection mirror of a vehicle lamp comprising the steps of setting a basic reflection surface as a curved surface based on body restrictive conditions, setting a plural number of paraboloids of revolution with different focal distances, which have a common axis and a focal position as a fixed point located in the vicinity of the basic reflection surface, and forming reflection steps defined by portions of the respective paraboloids of revolution between adjacent ones of curves formed as intersecting lines of the basic reflection surface and the paraboloids of revolution, wherein the step of setting a basic reflection surface comprises the steps of:

setting a candidate basic reflection surface, said surface being defined by setting conditions;

calculating incident angles at which light emitted from a light source located at the focal position is incident at different positions on the candidate basic reflection surface;

evaluating a distribution of the incident angles on the candidate basic reflection surface and producing a corresponding evaluation; and if the result of the evaluating step reaches a preset evaluation level, setting the candidate basic reflection surface as the final basic reflection surface, and if the result of the evaluation step fails to reach said preset evaluation level, changing the setting condition to another setting condition, and repeating the step of setting the preliminary basic reflection surface under said another setting condition and the step of evaluating the incident angle distribution on the candidate basic reflection surface until the result of the evaluation step reaches the preset evaluation level or the repeated steps are repeated a predetermined number of times.

3. A method of forming a reflection surface of a reflection mirror of a vehicle lamp according to claim 2, wherein the step of setting the candidate basic reflection surface is first executed under first body restrictive conditions, and if the result of the evaluation step fails to reach the preset evaluation level, the subsequent step of setting the preliminary basic reflection surface is executed under second body restrictive conditions said second conditions being more precise than said first conditions.

4. A method of forming a reflection surface of a reflection mirror of a vehicle lamp according to claim 1, wherein the evaluation step of the incident angle distribution is made on the basis of a plural number of contours of equal incident angles depicted on the candidate basic reflection surface to be evaluated.

5. A method of forming a reflection surface of a reflection mirror of a vehicle lamp according to claim 2, wherein the evaluation step of the incident angle distribution is made on the basis of a plural number of contours of equal incident aides depicted on the candidate basic reflection surface to be evaluated.

6. A method of forming a reflection surface of a reflection mirror of a vehicle lamp according to claim 3, wherein the evaluation step of the incident angle distribution is made on the basis of a plural number of contours of equal incident angles depicted on the candidate basic reflection surface to be evaluated.

7. A method of forming a reflection surface of a reflection mirror of a vehicle lamp according to claim 4, wherein areas each between adjacent ones of the contours of equal incident angles are visually presented with different colors.

8. A method of forming a reflection surface of a reflection mirror of a vehicle lamp according to claim 5, wherein areas each between adjacent ones of the contours of equal incident angles are visually presented with different colors.

9. A method of forming a reflection surface of a reflection mirror of a vehicle lamp according to claim 6, wherein areas each between adjacent ones of the contours of equal incident angles are visually presented with different colors.

10. A computer-readable medium encoded with a computer program for forming a reflection surface of a reflection minor of a vehicle lamp, the computer program comprising the steps of:

reading setting condition data for a free curved surface;

setting a preliminary basic reflection surface based on the setting condition data;

calculating angles at which light emitted from a light source located at a focal position is incident on different positions on the preliminary basic reflection surface;

evaluating a distribution of said angles said evaluating step being based upon at least one evaluation level;

if the result of the evaluating step reaches a preset evaluation level, setting the preliminary basic reflection surface as a final basic reflection surface; and if the result of the evaluation step fails to reach the preset evaluation level, repeating the reading, setting, calculating and, evaluating steps.

11. The computer readable medium of claim 10 wherein said evaluating step is conducted on the basis of angle values that are incident angles.

12. The computer readable medium of claim 10 wherein said evaluating step is conducted on the basis of angle values that are solid angles.

13. A display method using a computer for defining a light reflective surface of a vehicle lamp and a display connected to the computer, comprising the steps of:

forming a free curved surface of a shape providing an optically high efficiency;

displaying a basic surface formed by adding restrictive conditions of the vehicle to said surface of the shape; and displaying the state of light incident on said basic surface, said light being emitted from a light source.

14. A display method as claimed in claim 13, further comprising the steps of: correcting the basic surface to an optically suitable surface based on the state of incident light; and displaying the state of light incident on said corrected basic surface.

15. A display method as claimed in claim 13, wherein the state of light is a distribution of incident angles of the light.

16. A display method as claimed in claim 15, wherein the distribution of the incident angles is displayed by different colors.

17. A display method as claimed in claim 13, wherein said light source is a light bulb of a vehicle.

18. A reflection mirror for a vehicle lamp, comprising:

looped reflection surfaces formed on a corrected surface;

wherein said corrected surface is formed by first forming a free curved surface shape with an optically high efficiency, second, correcting the free curved surface shape in accordance with restrictive conditions of a vehicle to form a basic surface, displaying the state of light emitted from a light source and incident on said basic surface, and correcting the basic surface to achieve an optically desired surface.

* * * * *